US006755631B2

(12) United States Patent
Kawashima et al.

(10) Patent No.: US 6,755,631 B2
(45) Date of Patent: Jun. 29, 2004

(54) SECURING MEANS FOR A COMPRESSOR'S TERMINAL BOX

(75) Inventors: Uehito Kawashima, Ora-gun (JP); Katsuyuki Takeda, Fujioka (JP); Masahide Kobayashi, Hanyu (JP)

(73) Assignee: Sanyo Electric Co., Ltd., Moriguchi (JP)

(*) Notice: Subject to any disclaimer, the term of this patent is extended or adjusted under 35 U.S.C. 154(b) by 21 days.

(21) Appl. No.: 10/195,395

(22) Filed: Jul. 16, 2002

(65) Prior Publication Data

US 2003/0012669 A1 Jan. 16, 2003

(30) Foreign Application Priority Data

Jul. 16, 2001 (JP) ....................................... 2001-215340

(51) Int. Cl.$^{7}$ .......................... F04B 39/00; F04B 17/00; F04B 23/04; H02K 44/00; H01R 13/62

(52) U.S. Cl. .................. 417/572; 417/313; 417/423.14; 417/50; 417/521; 439/370

(58) Field of Search ................................ 417/902, 313, 417/572, 423.14; 174/50; 439/521, 718, 370, 350, 357, 358

(56) References Cited

U.S. PATENT DOCUMENTS

| | | | | |
|---|---|---|---|---|
| 5,160,247 A | * 11/1992 | Kandpal | | 417/415 |
| 5,252,036 A | * 10/1993 | Bunch et al. | | 417/313 |
| 5,342,215 A | * 8/1994 | Silbernagel et al. | | 439/357 |
| 5,769,659 A | * 6/1998 | Ceylan | | 439/521 |
| 5,873,710 A | * 2/1999 | Tucker | | 417/410.5 |

FOREIGN PATENT DOCUMENTS

| | | | |
|---|---|---|---|
| FR | 2 766 050 | * 1/1999 | H05K/7/14 |
| JP | 2-33478 | 2/1990 | |
| JP | 03-260379 | * 11/1991 | F04B/39/00 |
| JP | 05-141357 | * 6/1993 | F04B/39/00 |

* cited by examiner

*Primary Examiner*—Justine R. Yu
*Assistant Examiner*—Timothy P. Solak
(74) *Attorney, Agent, or Firm*—Armstrong, Kratz, Quintos, Hanson & Brooks, LLP

(57) ABSTRACT

A cover apparatus has a cover main body held to a compressor by using a clip to cover a terminal and electrical parts connected to the terminal, the clip having an elasticity. The cover main body has a an internal passageway or pass portion formed in an inner portion of the main body, and the clip has a press portion, an insertion portion extended from the press portion, and an engagement portion formed in the insertion portion. The insertion portion is inserted within the pass portion and the engagement portion is detachably engaged with a fence provided in the compressor in adjacent to the terminal by its elasticity, and the press portion contacts an outer surface of the cover main body.

12 Claims, 7 Drawing Sheets

SECURING MEANS FOR A COMPRESSOR'S TERMINAL BOX

BACKGROUND OF THE INVENTION

The present invention relates to a cover apparatus for a terminal in a compressor which is used for a cooling apparatus, for example, a refrigerator, a show case, an air conditioner and the like.

Conventionally, a terminal connected to an internal motor is provided on an outer surface of a shell in a compressor employed for this kind of cooling apparatus, and a cluster for feeding a power to the motor is connected to this terminal. Further, a starting relay, an overload relay operating by a detection of temperature in the compressor, a temperature switch and the like are arranged close to the cluster.

When electrical parts such as the cluster, the starting relay, the overload relay and the like, and the terminal itself are exposed to a water, a disadvantage such as a closed-circuit failure, a corrosion or the like is generated. Accordingly, there has been conventionally mounted a cover which covers the terminal and the electrical parts, as shown in Japanese Unexamined Patent Publication No. 2-33478.

However, since a cover main body (called an electric parts cover in the publication mentioned above) is held in the compressor by applying a clip (called a wire band in the same publication) from an outer side of the cover main body and engaging the clip with a fence (called as a bracket) in the compressor so as to press to cover main body it is troublesome to engage the clip with the fence.

Further, since a whole of the clip is positioned in an outer side of the cover main body, it is unavoidable that a whole shape becomes large. The publication proposes a method of mounting the cover main body without using the clip mentioned above, however, there is a problem in view of strength and it is impossible to employ the method.

A conventional clip 122 is shown in FIG. 14. The clip 122 holds a cover (not shown in FIG. 14) from an outer side and is formed in a shape as shown in FIG. 14, and has a press portion 139, arm portions 141 bent to an inner side from both ends of the press portion and engagement portion 142 further bent to an inner side from front ends of the arm portions 141. In the case of the shape mentioned above, since a restoring force of a steel rod constituting the clip 122 is applied in a direction of moving the engagement portions 142 and 142 apart from each other, the engagement portion 142 is always exposed to the restoring force in a direction in which the engagement is canceled.

SUMMARY OF THE INVENTION

The present invention is made in order to solve the conventional technical problems mentioned above, and an object of the present invention is to make a mounting operation easy and intend a compact structure in a cover apparatus for a terminal having a structure which holds the cover main body to a compressor by using a clip.

The cover apparatus for the terminal in accordance with the present invention is structured such as to cover a terminal provided in a compressor and electrical parts connected to the terminal, comprising:

- a cover main body for covering the terminal and the electrical parts; and
- a clip for holding the cover main body to the compressor, the clip having an elasticity,
- wherein the cover main body has a pass portion formed in an inner portion, the clip has a press portion, an insertion portion extended from the press portion and an engagement portion formed in the insertion portion, the insertion portion of the clip is inserted within the pass portion of the cover main body, the engagement portion is detachably engaged with a fence provided in the compressor in adjacent to the terminal due to an elasticity, and the press portion is brought into contact with an outer surface of the cover main body in this state so as to press the cover main body to a side of the compressor.

In accordance with the present invention, since the structure is made such that in the cover apparatus for the terminal which covers the terminal provided in the compressor and the electrical parts connected to the terminal, the cover apparatus is provided with the cover main body for covering the terminal and the electrical parts, and the clip for holding the cover main body to the compressor, the clip having an elasticity, the cover main body has the pass portion formed in the inner portion, the clip has the press portion, the insertion portion extended from the press portion and the engagement portion formed in the insertion portion, the insertion portion of the clip is inserted within the pass portion of the cover main body, the engagement portion is detachably engaged with the fence provided in the compressor in adjacent to the terminal due to the elasticity, and the press portion is brought into contact with the outer surface of the cover main body in this state so as to press the cover main body to a side of the compressor, it is possible to reduce a size of a whole of the clip and the cover main body, in comparison with the conventional mounting structure which applies the whole of the clip from the outer side of the cover main body so as to engage with the fence, by being used in the compressor. Further, since the insertion portion of the clip is inserted to the pass portion of the cover main body so as to engage the engagement portion with the fence, an engaging operation of the fence with the clip becomes easy and secure.

Further, in accordance with the present invention, there is provided a cover apparatus for a terminal as recited in the above, wherein a projection which is engaged before the engagement portion of the insertion portion inserted to the pass portion is engaged with the fence is formed within the pass portion.

In accordance with this invention, since the projection which is engaged before the engagement portion of the insertion portion inserted to the pass portion is engaged with the fence is formed within the pass portion, in addition to the matter mentioned above, it is possible to integrally form the cover main body with the clip by inserting the insertion portion of the clip within the pass portion of the cover main body and engaging the engagement portion with the projection. Accordingly, in the subsequent mounting operation, it is possible to hold the cover main body to the compressor only by applying the integrated structure to the terminal, next pressing the clip so as to cancel the engagement between the engagement portion and the projection and engaging the engagement portion with the fence, and a mounting operability is further improved.

Further, in accordance with the present invention, there is provided a cover apparatus for a terminal as recited in each of the inventions mentioned above, wherein an exposure portion in which at least a part of the insertion portion of the clip inserted within the pass portion is exposed to an external portion is formed in the pass portion.

In accordance with this invention, since the exposure portion in which at least a part of the insertion portion of the clip inserted within the pass portion is exposed to the external portion is formed in the pass portion, in addition to each of the inventions mentioned above, it is possible to cancel the engagement between the engagement portion and the fence by inserting a tool such as a screwdriver or the like within the pass portion from the exposure portion and deforming the insertion portion of the clip. Accordingly, it is easy to execute an operation of detaching the cover main body at a time of maintenance or the like. Further, since a state of the insertion portion can be seen from the exposure portion, it is possible to check out the engagement state between the engagement portion and the fence.

Further, in accordance with the present invention, there is provided a cover apparatus for a terminal as recited in each of the inventions mentioned above, wherein a shape of the cover main body is formed in a shape being along an outer shape of the terminal.

In accordance with this invention, since the shape of the cover main body is formed in the shape being along the outer shape of the terminal, in addition to each of the inventions mentioned above, it is possible to more effectively prevent a water or a dust from intruding into the terminal while making the cover main body further compact.

Further, in accordance with the present invention, there is provided a cover apparatus for a terminal as recited in each of the inventions mentioned above, wherein the clip is structured such that a press portion, a pair of insertion portions extending to an inner side from both ends of the press portion and engagement portions protruding to an outer side from front ends of the respective insertion portions are formed by bending a straight metal member, and the respective engagement portions are engaged with the fence from an inner side of the fence.

In accordance with this invention, since the clip is structured such that the press portion, a pair of insertion portions extending to the inner side from both ends of the press portion and the engagement portions protruding to the outer side from the front ends of the respective insertion portions are formed by bending the straight metal member, and the respective engagement portions are engaged with the fence from the inner side of the fence, in addition to each of the inventions mentioned above, a restoring force which the metal member constituting the clip is going to restore is applied in a direction of engaging the engagement portion with the fence. Accordingly, it is possible to stably maintain a mounting state of the clip to the fence over the long term. Further, since the clip is formed in the shape mentioned above, it is possible to obtain an effect that the clips are hard to intertwine with each other, in comparison with the structure in which the engagement portion is protruded to the inner side.

Further, in accordance with the present invention, there is provided a compressor comprising a terminal to which electrical parts are connected, wherein the terminal and the electric parts are covered by the cover apparatus for the terminal mentioned above.

DETAILED DESCRIPTION OF THE PREFERRED EMBODIMENT

Figure 1:
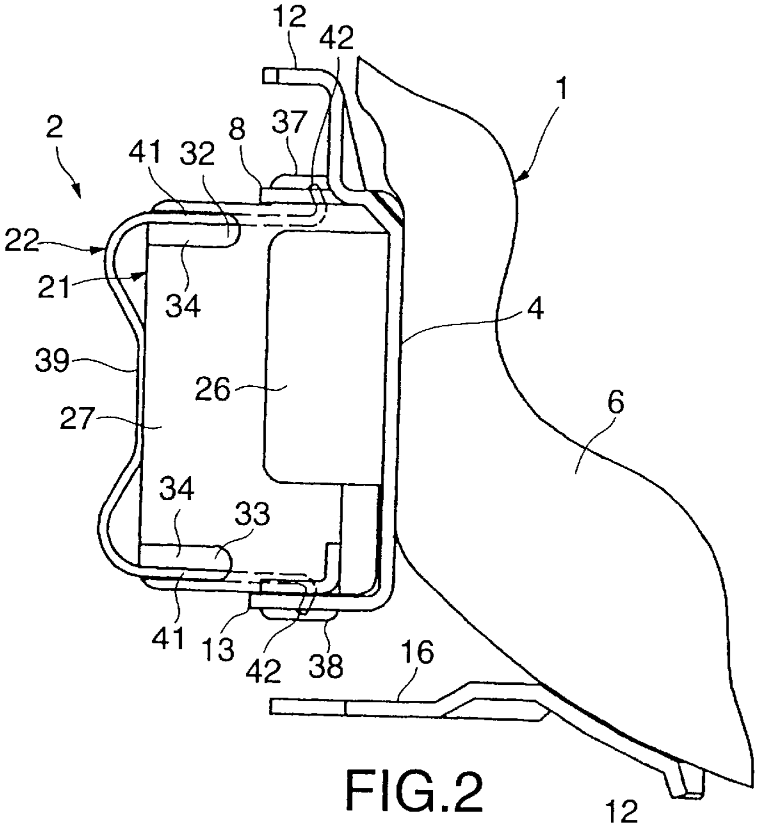
FIG. 1 is a side elevational view of a state in which a cover apparatus in accordance with the present invention is mounted to a compressor.
Figure 2:
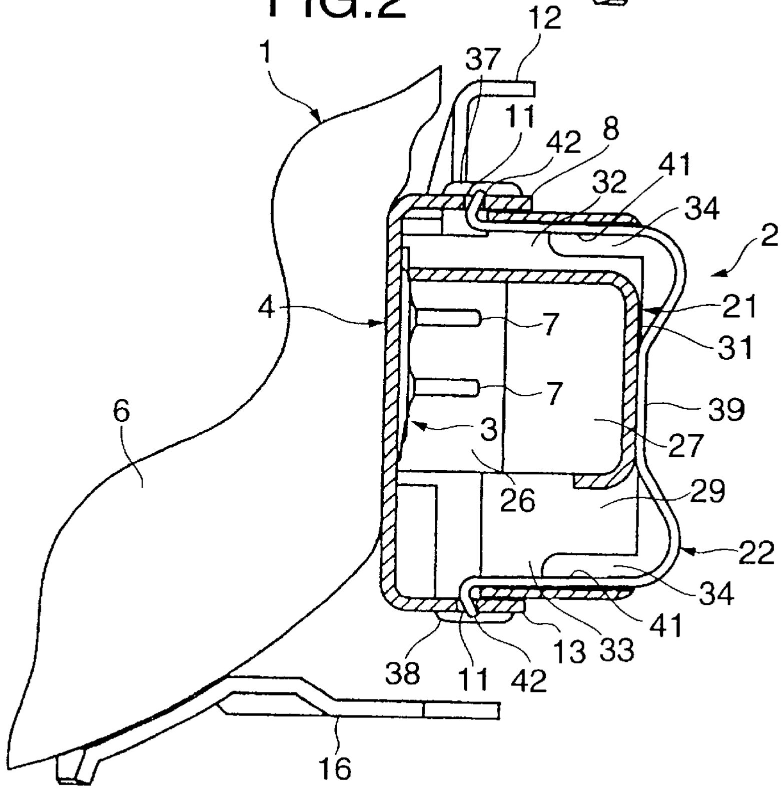
FIG. 2 is a vertical cross sectional side elevational view of the cover apparatus in accordance with the present invention in a state of being mounted to the compressor.

A description will be in detail given below of an embodiment in accordance with the present invention with reference to the accompanying drawings.

A compressor 1 in an embodiment to which the present invention is applied is operated in accordance with an inverter control, and constitutes a refrigerant circuit, for example, of a refrigerator or the like. In the respective drawings, reference numeral 6 denotes a curved shell (container made of a steel plate) of the compressor 1. A compression portion (not shown) (of a reciprocal type, a rotary type, a scroll type or the like) and a motor (not shown) for driving the compression portion are received within the shell 6. Further, a terminal 3 and a fence 4 are provided on a side surface of the shell 6. The terminal 3 is formed in a circular shape, is inserted into the shell 6, and is mounted so as to protrude a little to an outer side from a side surface of the shell 6, and three terminal posts 7 connected to the motor for feeling power to the motor within the shell 6 are provided in a protruding manner.

The fence 4 is constituted by bending a steal plate, and is welded and fixed to an outer aide of the side surface in the shell 6 in such a manner as to surround a periphery of the terminal 3. The fence 4 is used for mounting the cover apparatus 2 and transferring the compressor 1, and one is mounted to the side surface of the shell 6 at a position shown in each of the drawings and another is mounted to the side surface of the shell 6 at an opposite position thereto. Further, upper flanges 8 and 9 are formed in an upper edge of the fence 4 at right and left positions in an upper side of the terminal 3 so as to be bent in a horizontal direction, and an engaged portion 11 is formed in a cut manner in the right edge of the left upper flange 8 as one faces the flange. Further, another upper flange 12 is formed at a higher position than the upper flanges 8 and 9 immediately above the terminal 3 so as to be bent in a horizontal direction.

A lower flange 13 is formed in a lower edge of the fence at a position in a lower side of the terminal 3 so as to be bent in a horizontal direction, and a groove 14 is formed at a position corresponding to a lower side of the right edge of the upper flange 8 so as to be cut. Further, another engaged portion 11 is formed at a position corresponding to a lower side of the engaged portion 11 from a left edge of the groove 14 so as to be cut. In this case, reference numeral 16 denotes a leg of the compressor 1 mounted to the lower portion of the shell 6.

Figure 4:
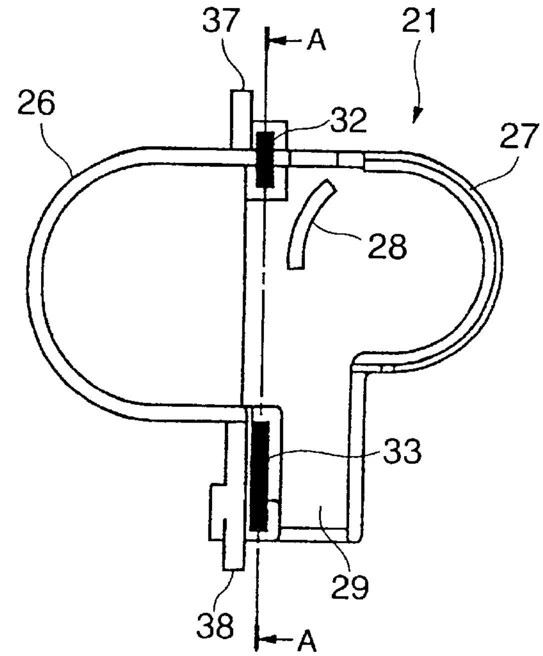
FIG. 4 is a front elevational view of a cover main body in the cover apparatus in accordance with the present invention.
Figure 5:
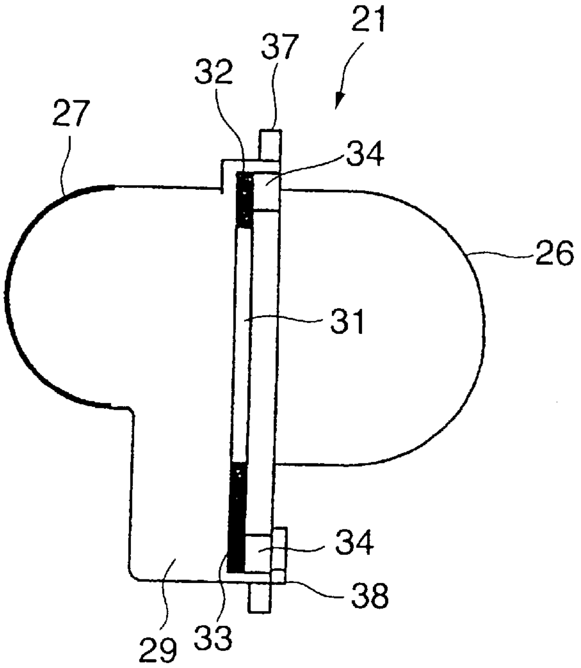
FIG. 5 is a back elevational view of the cover main body in the cover apparatus in accordance with the present invention.
Figure 6:
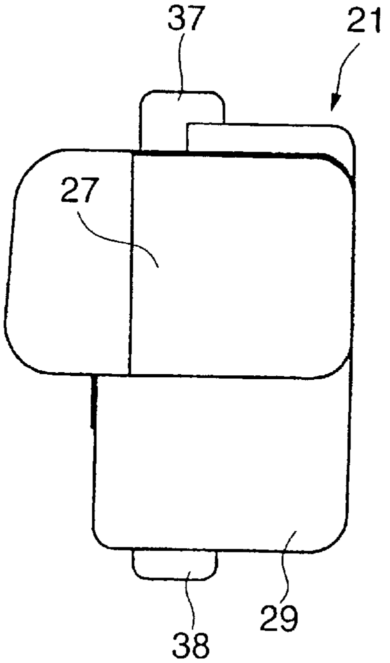
FIG. 6 is a side elevational view of the cover main body in the cover apparatus in accordance with the present invention.
Figure 7:
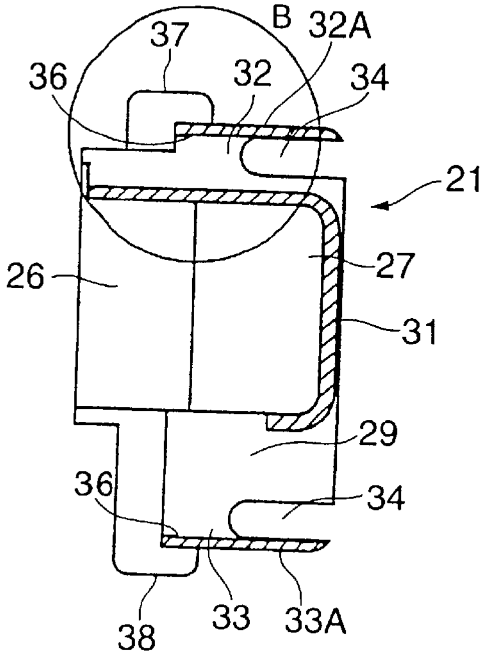
FIG. 7 is a cross sectional view along a line A—A in FIG. 4.
Figure 8:
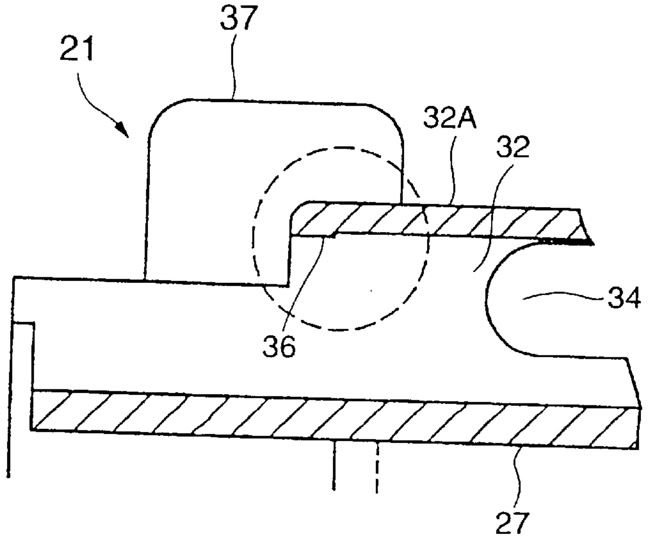
FIG. 8 is an enlarged view of a portion of a circle B in FIG. 7.
Figure 9:
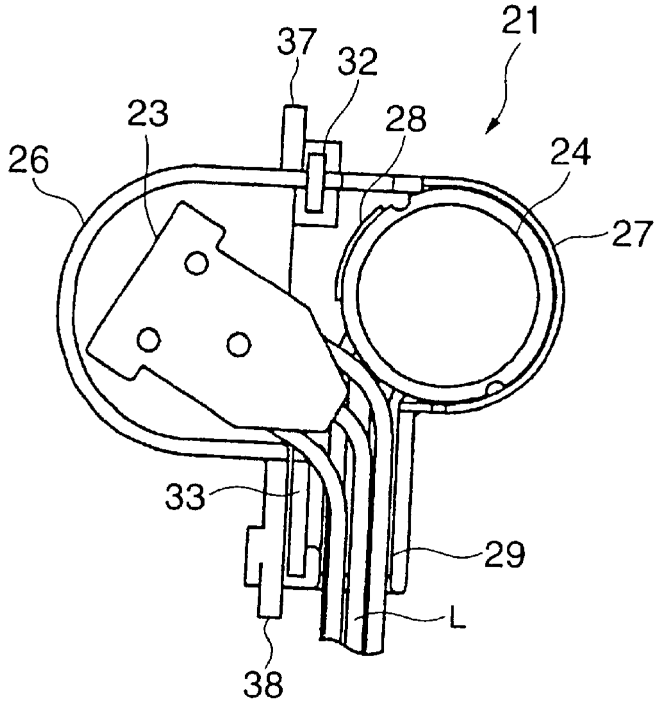
FIG. 9 is a front elevational view of a cover main body in a state in which a cluster and an overload relay corresponding to electrical parts are received.

On the contrary, the cover apparatus 2 in accordance with the present invention is constituted by a cover main body 21, and a clip 22 for holding the cover main body 21 to the shell 6 of the compressor 1. FIG. 4 is a front elevational view of the cover main body 21, FIG. 5 is a back elevational view, FIG. 6 is a side elevational view, FIG. 7 is a cross sectional view along a line A—A in FIG. 4, FIG. 8 is an enlarged view of a portion of a circle B in FIG. 7, and FIG. 9 is a front elevational view of the cover main body 21 in a state in which a cluster 23 and an overload relay 24 corresponding to electrical parts are received. In this case, the cluster 23 is a connector which is connected to the terminal posts 7 of the terminal 3, and has three holes to which the terminal posts 7 are fitted. Further, the overload relay 24 is a relay detecting a temperature of the shell 6 in the compressor 1, thereby controlling so as to stop the compressor 1 at a time when a temperature is abnormally increased.

The cover main body 21 formed by a fire-retardant resin or the like, and is formed in a container shape as a whole in which a front face is opened, and a terminal coating portion 26 for receiving the cluster 23 so as to coat (cover) the terminal 3, and an overload relay coating portion 27 for receiving the overload relay 24 so as to coat the overload relay 24, the overload relay coating portion 27 being positioned in a side portion thereof, are integrally formed. An internal shape and an outer shape of the terminal coating portion 26 are formed in a semicircular shape being along the outer shape of the terminal 3, and the overload relay coating portion 27 is formed in a semicircular internal shape and outer shape in conformity with the outer shape of the overload relay 24. In this case, reference numeral 28 denotes a circular arc-shaped pressing wall formed within the overload relay coating portion 27. Further, an opening edge of the overload relay coating portion 27 is formed in a shape being along the curved shape of the side surface of the shell 6.

Further, a lead wire outgoing portion 29 for drawing out a lead wire L from the cluster 23 and the overload relay 24 extends to a lower side from a portion between the terminal coating portion 26 and the overload relay coating portion 27 so as to be integrally formed, and a lower end of the lead wire outgoing portion 29 is free. Further, a narrow recess portion 31 is formed on a back surface in a side of the terminal coating portion 26 of the lead wire outgoing portion 29 so as to extend vertically, and pass portions 32 and 33 extending through the cover main body 21 from a back surface to a front surface are formed in an upper end portion and a lower end portion of the recess portion 31. A width of the pass portions 32 and 33 is the same as a width of the recess portion 31, and an inner surface is formed in a rectangular cross sectional shape having a size in which an insertion portion 41 and an engagement portion 42 of the clip 22 mentioned above can pass through.

Further, as shown in FIG. 7, an upper wall 32A of the pass portion 32 and a lower wall 33A of the pass portion 33 are ended before the opening edge of the cover main body 21, and a projection 36 as shown in an enlarged manner in FIG. 8 is formed in a stepped manner on an inner surface in a little rear side from a front end of the upper wall 32A and the lower wall 33A. A front end side of the projection 36 protrudes to the side of the pass portions 32 and 33.

Further, side walls of the pass portions 32 and 33 in a side of the terminal coating portion 26 are a little notched from a back surface side so as to form exposure portions 34. The exposure portion 34 is opened so as to have a size in which a screwdriver D mentioned below can be inserted. Further, positioning pieces 37 and 38 protruding in a vertical direction are integrally formed from portions positioned in front sides of the exposure portions 34 and 34.

Figure 10:
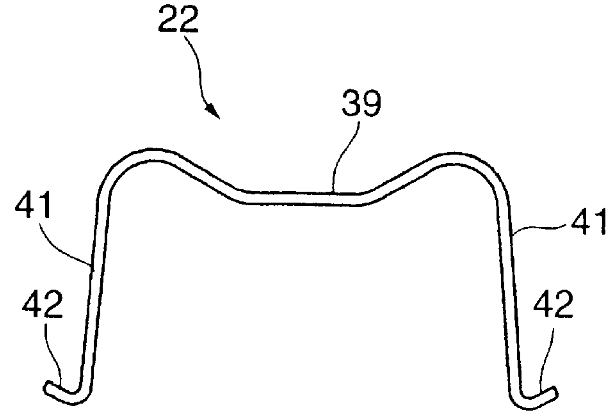
FIG. 10 is a front elevational view of a clip of the cover apparatus in accordance with the present invention.

On the other hand, the clip 22 is formed by bending a straight narrow steel rod (a metal member) having an elasticity, and is formed in an M shape as a whole as shown in FIG. 10. That is, a press portion 39 which is a little recessed to an inner side (a lower side in FIG. 10) is constructed in a center portion, and the insertion portions 41 and 41 bent to an inner side are continuously provided in both side ends of the press portion 39. Further, front end portions of the insertion portions 41 and 41 are bent back to an outer side at an acute angle, and the engagement portions 42 and 42 (a part of the insertion portion 41) protruding to an outer side are respectively formed there.

On the basis of the structure mentioned above, a description will be given next of an operation at a time of mounting the cover apparatus 2 in accordance with the present invention with reference to FIGS. 11 and 12. At first, as shown in FIG. 9, the overload relay 24 is tightly received within the overload relay coating portion 27. Next, the cluster 23 is mounted to the terminal 3 by fitting the terminal posts 7 of the terminal 3 to the holes of the cluster 23. Further, the lead wire L is drawn out to the lower side from the lead wire outgoing portion 29. In this case, in FIGS. 11 and 12, the cluster 23 and the overload relay 24 are omitted.

Next, the clip 22 is stood so that the engagement portions 42 and 42 are arranged vertically, and the respective insertion portions 41 and 41 are a little deformed in a direction in which both of the engagement portions 42 and 42 move close to each other. Further, the vertically positioned insertion portions 41 and 41 are inserted from the side of the engagement portions 42 and 42 within the pass portions 32 and 32 of the cover main body 21 from the back surface side. At this time, since the front end portions of the engagement portions 42 and 42 are inserted while being brought into contact with the upper wall 32A of the pass portion 32 and the inner surface of the lower wall 33A in the pass portion 33 due to a restoring force, the pass portions 32 and 33 serve as a guide for inserting the clip 22. Accordingly, it is easy to insert the clip 22.

Figure 11:
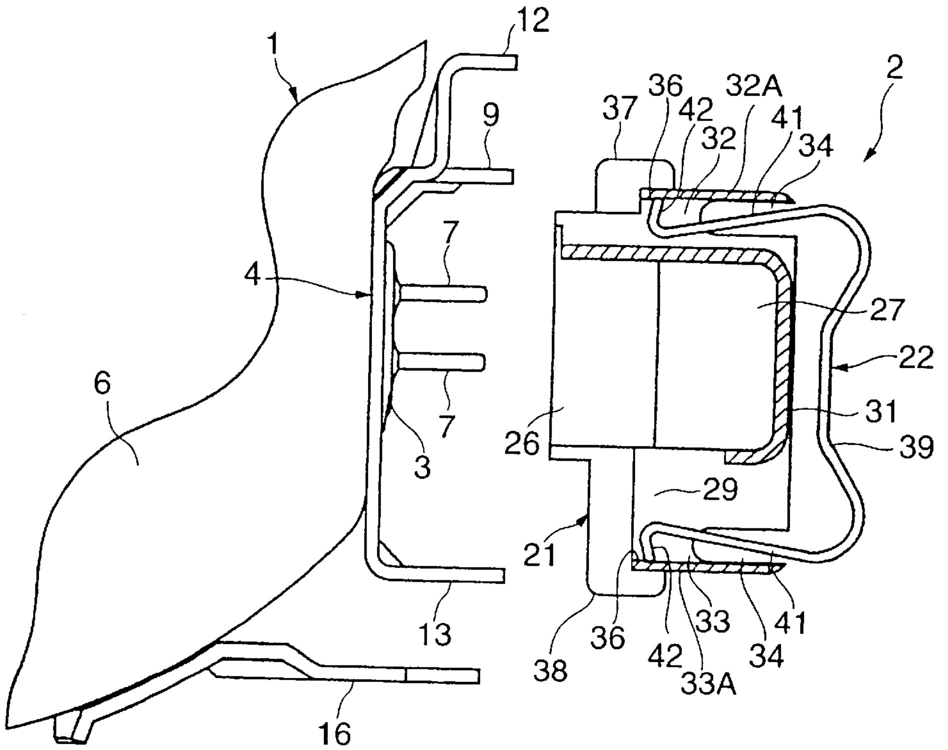
FIG. 11 is a schematic view explaining a procedure of mounting the cover apparatus in accordance with the present invention to the compressor.

When inserting the clip 22 in the manner mentioned above, the engagement portions 42 and 42 are brought into contact with and engaged with the projections 36 and 36 before the press portion 39 is brought into contact with the recess portion 31, so that the insertion of the clip 22 is once stopped, and the clip 22 is held to the cover main body 21 (FIG. 11). Accordingly, it is possible to integrally form the cover main body 21 with the clip 22 before mounting.

Figure 3:
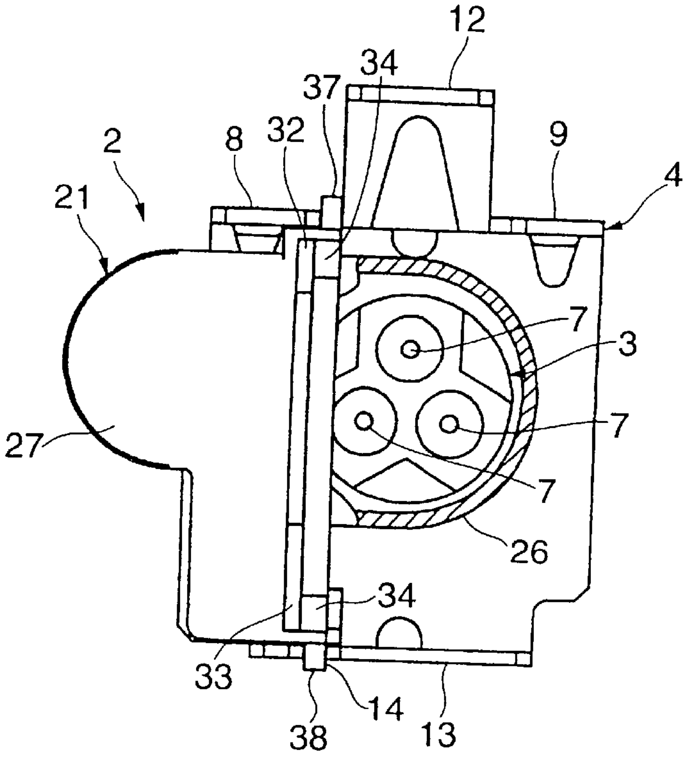
FIG. 3 is a partly notched front elevational view of a terminal and a fence of the compressor and the cover apparatus.
Figure 12:
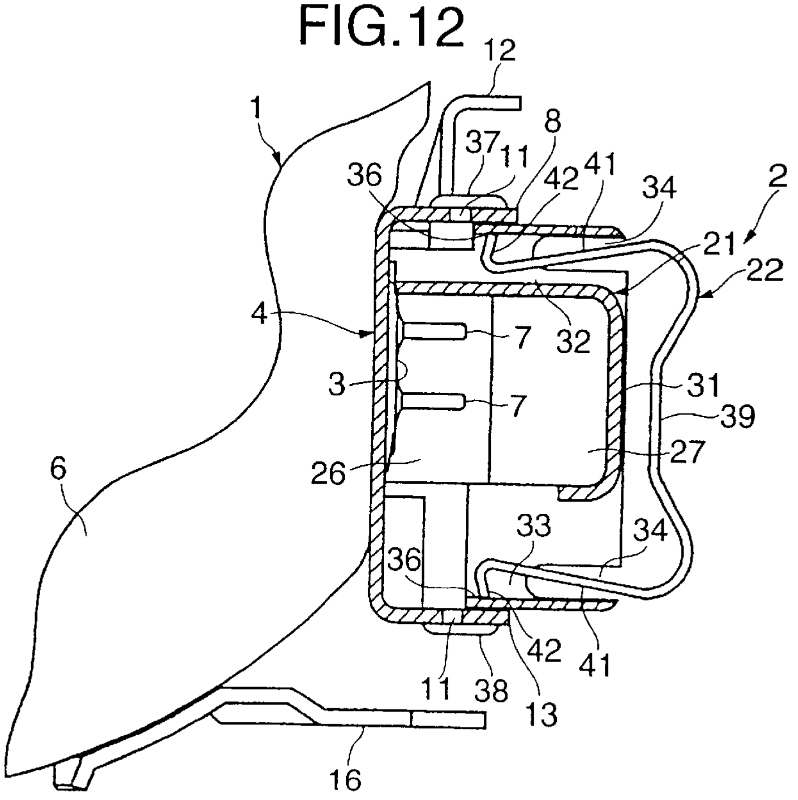
FIG. 12 is a schematic view explaining the procedure of mounting the cover apparatus in accordance with the present invention to the compressor.

In the manner mentioned above, the cover main body 21 and the clip 22 are applied to the terminal 3 and the fence 4 in a state in which the cover main body 21 and the clip 22 are integrally formed, the cluster 23 and the terminal 3 are coated by the cluster receiving portion 26, and the cluster 23 is received within the terminal coating potion 26 (a state in FIG. 12). At this time, the opening portion of the terminal coating portion 26 coats the terminal 3 along the side surface of the terminal 3 as shown in FIG. 3. Further, the upper wall 32A of the pass portion 32 coincides with the lower surface of the upper flange 8, and the lower wall 33A of the pass portion 33 coincides with the upper surface of the lower flange 13. Further, the opening edge of the cover main body 21 is brought into contact with the fence 4 and the shell 6, the positioning piece 37 moves forward between the upper flanges 8 and 12 of the fence 4 so as to be engaged, and the positioning piece 38 moves forward within the groove 14 of the lower flange 13 so as to be engaged. Accordingly, the cover main body 21 is positioned with respect to the shell 6 of the compressor 1, and coats the terminal 3, the cluster 23 and the overload relay 24. In this case, the overload relay 24 is brought into contact with the shell 6 in this state so as to be capable of detecting the temperature.

Next, when further pressing the clip 22 to the side of the compressor 1 from the state shown in FIG. 12, the insertion portions 41 and 41 deform portions 41 and 41 are deformed to an inner side, and the engagement portions 42 and 42 easily ride over the projection 36, so that the clip 22 can be further inserted. Then, the engagement portions 42 and 42 get to the engaged portions 11 and 11 of the fence 4. At this time, since the insertion portions 41 and 41 of the clip 22 are expanded in a direction in which both of the engagement portions 42 and 42 move apart from each other due to the restoring force, the vertically positioned engagement portions 42 and 42 move forward within the engaged portions 11 and 11 from the inner side of the fence 4 so as to be engaged therewith.

Since the press portion 39 of the clip 22 enters into the recess portion 31 of the cover main body 21 and presses there from the back surface side, the cover main body 21 is pressed and held in the direction of the shell 6 (the fence 4). Further, since in the clip 22, the restoring force thereof is applied in the direction in which the insertion portions 41 and 41 move apart from each other, the engagement between each of the engagement portions 42 and the engaged portion 11 can be stably maintained.

Figure 14:
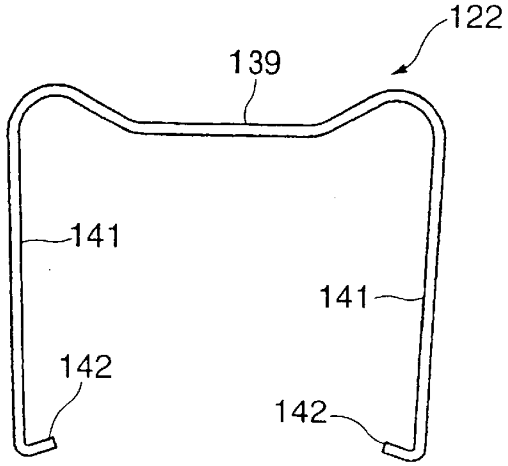
FIG. 14 (PRIOR ART)
FIG. 14 is a front elevational view of a conventional clip.

As was mentioned above under the heading Background of the Invention, a conventional clip 122 which holds the cover from an outer side is formed in a shape as shown in FIG. 14, and has a press portion 139, arm portions 141 bent to an inner side from both ends of the press portion and engagement portion 142 further bent to an inner side from front ends of the arm portions 141. In the case of the shape mentioned above, since a restoring force of a steel rod constituting the clip 122 is applied in a direction of moving the engagement portions 142 and 142 apart from each other, the engagement portion 142 is always exposed to the restoring force in a direction in which the engagement is canceled.

However, in accordance with the present invention, since the restoring force of the clip 22 is applied in a direction in which the engagement portion 42 is engaged by the engaged portion 11, the risk that the clip 22 falls away is removed, and it is possible to stably hold the cover main body 21.

Further, in the shape shown in FIG. 14, in the case that a lot of clips are stacked, the engagement portion 142 easily catches on the other clips, however, in the shape shown in FIG. 10, since the engagement portion 42 is directed to the outer side, the clip 22 easily falls away even when the clip 22 catches on the other clips 22.

Further, positions of the root portions of the insertion portions, 41 and 41 can be viewed from the exposure portions 34 and 34 (FIG. 1). That is, it is possible to judge that the engagement portion 42 and the engaged portion 11 are not engaged yet in the case that the insertion portions 41 and 41 are apart from the inner surfaces of the upper wall 32A and the lower w~ll 33A in the pass portions 32 and 33, and it is possible to judge that the engagement portion 42 and the engaged portion 11 are engaged when the insertion portions 41 and 41 are along the inner surfaces of the upper wall 32A and the lower wall 33A in the pass portions 32 and 33. Accordingly, it is possible to securely engage the engagement portions 42 and 42 with the engaged portions 11 and 11.

Figure 13:
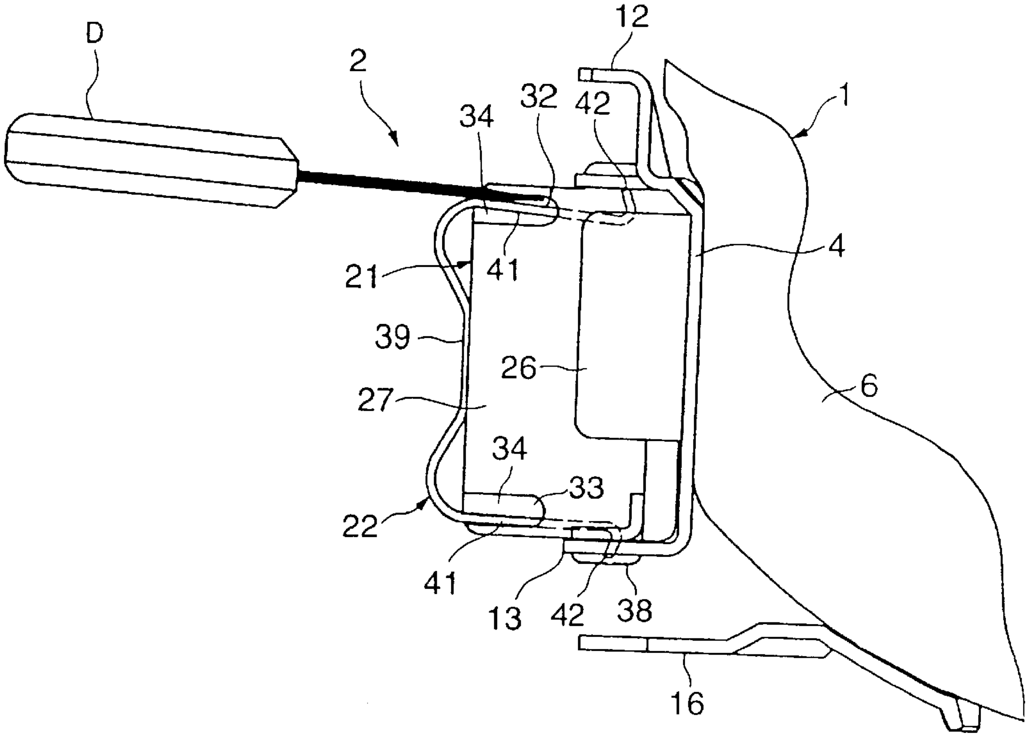
FIG. 13 is a schematic view explaining an operation at a time of taking out the cover apparatus in accordance with the present invention from the compressor.

Next, when taking out the cover apparatus 2 from the compressor 1 for the purpose of maintaining the cluster 23 and the overload relay 23, the screwdriver D is inserted from the exposure portion 34 as shown in FIG. 13, and a front end of the screwdriver is inserted, for example, to a portion between the insertion portion 41 of the clip 22 and the upper wall 32A so as to deform the insertion portion 41 to the lower side. Accordingly, since the engagement portion 42 moves apart from the engaged portion 11, the clip 22 and the cover main body 21 can be easily taken out.

By employing the structure mentioned above, in accordance with the present invention, in comparison with the conventional mounting structure in which the whole of the clip is applied from the outer side of the cover main body so as to be engaged with the fence 4, it is possible to reduce the size of the clip 22 and the whole size of the cover main body 21. Further, since the engagement portions 42 and 42 are engaged with the engaged portions 11 and 11 of the fence 4 by inserting the insertion portions 41 and 41 of the clip 22 within the pass portions 32 and 32 of the cover main body 21, it is possible to easily and securely execute the operation of engaging the clip 22 with the fence 4.

Further, since the projection 36 which is engaged before the engagement portions 42 and 42 of the insertion portions 41 and 41 inserted to the pass portions 32 and 33 are engaged with the engaged portions 11 and 11 of the fence 4 are formed within the pass portions 32 and 33, the cover main body 21 and the clip 22 can be integrally formed by inserting the insertion portions 41 and 41 of the clip 22 within the pass portions 32 and 33 of the cover main body 21 and engaging the engagement portions 42 and 42 with the projection 36. Accordingly, in the subsequent mounting operation, the cover main body 21 can be held to the compressor 1 only by applying the integrally formed structure to the terminal 3, next pressing the clip 22 so as to cancel the engagement between the engagement portion 42 and the projection 36 and engaging the engagement portion 42 with the engaged portion 11 of the fence 4, and a mounting operability is further improved.

Further, since the exposure portion 34 in which the root portions of the insertion portions 41 and 41 of the clip 22 inserted to the pass portions 32 and 33 are exposed to the external portion are formed in the pass portions 32 and 33, the engagement between the engagement portion 42 and the engaged portion 11 of the fence 4 can be cancelled by inserting a tool such as the screwdriver D or the like within the pass portion 32 or 33 from the exposure portion 34 and deforming the insertion portion 41 of the clip 22. Accordingly, it is easy to execute the operation of taking out the cover main body 21 at a maintenance time or the like. Further, since the state of the insertion portion 41 can be seen from the exposure portion 34, the engaging state between the engagement portion 42 and the engaged portion 11 can be checked out.

Further, since the shape of the terminal coating portion 26 of the cover main body 21 is formed in the shape being along the outer shape of the terminal 3, it is possible to more effectively prevent the water or the dust from intruding to the terminal 3.

Further, since the clip 22 is structured such that the press portion 39, a pair of insertion portions 41 and 41 extending to the inner side from both ends of the press portion 39, and the engagement portions 42 and 42 protruding to the outer side from the front ends of the respective insertion portions 41 and 41 are respectively formed by bending the straight steel rod, and the respective engagement portions 42 and 42 are engaged with the engaged portions 11 from the inner side of the fence 4, the force by which the steel rod constituting the clip 22 is going to restore is applied in the direction of engaging the engagement portion 42 with the engaged portion 11. Accordingly, it is possible to stably maintain the mounting state of the clip 22 to the fence 4 over the long term.

Further, since the clip 22 is formed in the shape mentioned above, in comparison with the structure in which the engagement portion 142 is protruded to the inner side from the arm portion 141 as shown in FIG. 14, there can be obtained an effect that the clips are hard to intertwine with each other.

In this case, in the embodiment, the through hole is constituted by the pass portions 32 and 33, however, the structure is not limited to this, the respective pass portions 32 and 33 may be formed in an inner portion of a flange, for example, formed in an L-shaped cross section and respectively having the upper wall 32A and the lower wall 33A. Further, the clip 22 is not limited to the steel rod, and may be constituted by a narrow metal plate (in a leaf spring shape). Further, the pass portions 32 and 33 of the cover main body 21 may be formed in a shape which is positioned in an outer side of the upper and lower flanges 8 and 13 in the fence 4, and in this case, the engagement portion 42 of the clip 22 is inserted along the fence 4 and is engaged with the engagement portion 11 of the flange.

Further, the electrical parts coated by the cover apparatus 2 are not limited to the embodiment, and a starting relay, a temperature switch or the like may be employed in correspondence to the driving type of the compressor.

As described in detail above, in accordance with the present invention, since the structure is made such that in the cover apparatus for the terminal which covers the terminal provided in the compressor and the electrical parts connected to the terminal, the cover apparatus is provided with the cover main body for covering the terminal and the electrical parts, and the clip for holding the cover main body to the compressor, the clip having an elasticity, the cover main body has the pass portion formed in the inner portion, the clip has the press portion, the insertion portion extended from the press portion and the engagement portion formed in the insertion portion, the insertion portion of the clip is inserted within the pass portion of the cover main body, the engagement portion is detachably engaged with the fence provided in the compressor in adjacent to the terminal due to the elasticity, and the press portion is brought into contact with the outer surface of the cover main body in this state so as to press the cover main body to a side of the compressor, it is possible to reduce a size of a whole of the clip and the cover main body, in comparison with the conventional mounting structure which applies the whole of the clip from the outer side of the cover main body so as to engage with the fence, by being used in the compressor. Further, since the insertion portion of the clip is inserted to the pass portion of the cover main body so as to engage the engagement portion with the fence, an engaging operation of the fence with the clip becomes easy and secure.

Further, in accordance with the present invention, since the projection which is engaged before the engagement portion of the insertion portion inserted to the pass portion is engaged with the fence is formed within the pass portion, in addition to the matter mentioned above, it is possible to integrally form the cover main body with the clip by inserting the insertion portion of the clip within the pass portion of the cover main body and engaging the engagement portion with the projection. Accordingly, in the subsequent mounting operation, it is possible to hold the cover main body to the compressor only by applying the integrated structure to the terminal, next pressing the clip so as to cancel the engagement between the engagement portion and the projection and engaging the engagement portion with the fence, and a mounting operability is further improved.

Further, in accordance with the present invention, since the exposure portion in which at least a part of the insertion portion of the clip inserted within the pass portion is exposed to the external portion is formed in the pass portion, in addition to each of the inventions mentioned above, it is possible to cancel the engagement between the engagement portion and the fence by inserting a tool such as a screwdriver or the like within the pass portion from the exposure portion and deforming the insertion portion of the clip. Accordingly, it is easy to execute an operation of detaching the cover main body at a time of maintenance or the like. Further, since a state of the insertion portion can be seen from the exposure portion, it is possible to check out the engagement state between the engagement portion and the fence.

Further, in accordance with the present invention, since the shape of the cover main body is formed in the shape being along the outer shape of the terminal, in addition to each of the inventions mentioned above, it is possible to more effectively prevent a water or a dust from intruding into the terminal while making the cover main body further compact.

Further, in accordance with the present invention, since the clip is structured such that the press portion, a pair of insertion portions extending to the inner side from both ends of the press portion and the engagement portions protruding to the outer side from the front ends of the respective insertion portions are formed by bending the straight metal member, and the respective engagement portions are engaged with the fence from the inner side of the fence, in addition to each of the inventions mentioned above, a restoring force which the metal member constituting the clip is going to restore is applied in a direction of engaging the engagement portion with the fence. Accordingly, it is possible to stably maintain a mounting state of the clip to the fence over the long term.

Further, since the clip is formed in the shape mentioned above, it is possible to obtain an effect that the clips are hard to intertwine with each other, in comparison with the structure in which the engagement portion is protruded to the inner side.

What is claimed is:

1. A cover apparatus for a terminal which covers a terminal provided in a compressor and electrical parts connected to said terminal, wherein the compressor includes a fence provided in said compressor adjacent to said terminal; said cover apparatus comprising:

a cover main body for covering said terminal and said electrical parts; and an elastic clip for holding said cover main body to said compressor, said clip being generally U-shaped and comprising a central pressing portion, an insertion portion extended from said pressing portion on either side thereof, and an engagement portion diseased at a respective front end of each insertion portion farthest from the central pressing portion, wherein said cover main body comprises at least one internal passageway wherein the insertion portion of said clip is inserted, said engagement portion is detachably engaged with fence by elasticity of the clip, and said pressing portion is brought into contact with a recess portion of said cover main body in this state so as to press said cover main body onto the compressor.

2. The cover apparatus for a terminal as claimed in claim 1, wherein said insertion portions extend to an inner side from both ends of said press portion and said engagement portions protrude to an outer side from front ends of the respective insertion portions.

3. The cover apparatus for a terminal as claimed in claim 1, wherein said elastic clip comprises a bendable elastic metal member.

4. The cover apparatus for a terminal as claimed in claim 1, wherein said internal passageway includes a portion having a rectangular cross section.

5. The cover apparatus for a terminal as claimed in claim 4, wherein the rectangular cross section has a width corresponding to a thickness of the elastic clip and a length corresponding to a length of the engagement portion.

6. The cover apparatus for a terminal as claimed in claim 1, wherein the passageway comprises an internal projection further comprising a step on an internal surface of the passageway located to engage a tip of the engagement portion of the clip.

7. A cover apparatus for a terminal which covers a terminal provided in a compressor and electrical parts connected to said terminal, wherein the compressor includes a fence provided in said compressor adjacent to said terminal; said cover apparatus comprising:

a cover main body for covering said terminal and said electrical parts; and an elastic clip for holding said cover main body to said compressor, said clip being generally U-shaped and comprising a central pressing portion, an insertion portion extended from said pressing portion on either side thereof, and an engagement portion, wherein said cover main body includes a pass portion formed in an inner portion, wherein the insertion portion of said clip is inserted within the pass portion of said cover main body, said engagement portion is detachably engaged with the fence by elasticity of the clip, and said pressing portion is brought into contact with a recess portion of said cover main body in this state so as to press said cover main body onto the compressor; and wherein a projection which is engaged before the engagement portion, of said insertion portion inserted into said pass portion to engage with said fence, is formed within said pass portion.

8. The cover apparatus for a terminal as claimed in claim 7, wherein the passageway comprises an exposure portion in which at least a part of the insertion portion of said clip inserted within said pass portion is exposed to outside of said internal passageway.

9. The cover apparatus for a terminal as claimed in claim 7, wherein the pass portion comprises an exposure portion in which at least a part of the insertion portion of said clip inserted within said pass portion is exposed to outside of said pass portion.

10. The cover apparatus for a terminal as claimed in claim 1 or 7, wherein a shape of said cover main body is formed in a shape following along an outer shape of said terminal.

11. The cover apparatus for a terminal as claimed in claim 1 or 7, wherein each respective engagement portion is engaged with said fence from an inner side of said fence.

12. The compressor comprising said terminal to which said electrical parts are connected, wherein said terminal and the electric parts are covered by the cover apparatus for the terminal as claimed in claim 1 or 7.

* * * * *